US012704026B2

(12) United States Patent
Dai et al.

(10) Patent No.: US 12,704,026 B2
(45) Date of Patent: Aug. 11, 2026

(54) DRILLING APPARATUS, DRILL BIT, AND METHOD FOR TESTING DRILL BIT PERFORMANCE

(71) Applicant: Georgia Tech Research Corporation, Atlanta, GA (US)

(72) Inventors: Sheng Dai, Atlanta, GA (US); Yumeng Zhao, Atlanta, GA (US)

(73) Assignee: GEORGIA TECH RESEARCH COPORATION, Atlanta, GA (US)

( * ) Notice: Subject to any disclaimer, the term of this patent is extended or adjusted under 35 U.S.C. 154(b) by 0 days.

(21) Appl. No.: 19/059,497

(22) Filed: Feb. 21, 2025

(65) Prior Publication Data

US 2025/0263985 A1 Aug. 21, 2025

Related U.S. Application Data

(60) Provisional application No. 63/567,015, filed on Mar. 19, 2024, provisional application No. 63/556,197, filed on Feb. 21, 2024.

(51) Int. Cl.

| | |
|---|---|
| ***E21B 10/573*** | (2006.01) |
| ***B33Y 80/00*** | (2015.01) |
| ***E21B 45/00*** | (2006.01) |
| ***G01M 13/00*** | (2019.01) |

(52) U.S. Cl.

CPC ............ *E21B 10/573* (2013.01); *B33Y 80/00* (2014.12); *E21B 45/00* (2013.01); *G01M 13/00* (2013.01); *E21B 2200/20* (2020.05)

(58) Field of Classification Search

CPC .... E21B 10/573; E21B 45/00; E21B 2200/20; E21B 10/00; B33Y 80/00; G01M 13/00

See application file for complete search history.

(56) References Cited

U.S. PATENT DOCUMENTS

| | | | | |
|---|---|---|---|---|
| 2012/0152011 | A1* | 6/2012 | Zamora | E21B 10/00 73/152.03 |
| 2021/0071479 | A1* | 3/2021 | Deen | E21B 10/43 |
| 2021/0180409 | A1* | 6/2021 | Davila | E21B 10/5735 |
| 2022/0003046 | A1* | 1/2022 | Yu | E21B 10/55 |
| 2023/0028472 | A1* | 1/2023 | Atkins | E21B 10/5673 |

OTHER PUBLICATIONS

Ramasubramanian, M.K. et al. Mechanics of a mosquito bite with applications to microneedle design, Bioinspiration & Biomimetrics, vol. 3, (2008), No. 4, 0046001, IOP Publishing Ltd., printed in the UK.

(Continued)

*Primary Examiner* — Yanick A Akaragwe

(74) *Attorney, Agent, or Firm* — Blank Rome LLP

(57) ABSTRACT

A drilling apparatus, drill bit and method for testing drill bit performance. The drilling apparatus and method include a vertical load mechanism that is configured to move a sample container holding a substrate material downwardly at a constant displacement rate toward a drill bit component, while a rotary motion assembly rotates the drill bit component. The drill bit includes a plurality of cutters each having a 0 degree rake angle and curved cutting face.

16 Claims, 10 Drawing Sheets

(56) References Cited

OTHER PUBLICATIONS

Detournay, Emmanuel et al., Drilling response of drag bits: Theory and experiment, International Journal of Rock Mechanics & Mining Sciences 45 (2008) p. 1347-1360, www.elsevier.com/locate/ijrmms.
Liu, Weiji et al., The PDC cutter-rock interaction behavior in rock cutting: A review, Geoenergy Science and Engineering, 229 (2023) 212168, www.sciencedirect.com/journal/geoenergy-science-and-engineering.
Detourney, T. Richard et al., The scratch test as a means to measure strength of sedimentary rocks, 1998, Society of Petroleum Engineers, Inc., SPE/ISRM 47196.
Gerbaud, Laurent et al., PDC Bits: All comes from the cutter rock interaction, SPE/IADC Drilling Conference and Exhibition, SPE 2006, IADC/SPE-98988, Hal id: hal-00585922. https://minesparis-psl.hal.science/hal-00585922v1.
Ju, Pei et al., Numerical simulation study on the optimization design of the crown shape of PDC drill bit, Journal of Petroleum Exploration and Production Technology, (2014), vol. 4, pp. 343-350, DOI 10.1007/s13202-013-0091-9.
Wang, Xu et al., A novel method for measuring and analyzing the interaction between drill bit and rock, Measurement, vol. 121, (2018), pp. 344-354, www.elsevier.com/locate/measurement.
Ma, Yachao et al., Optimal design of a global force-balanced polycrystalline diamond compact bit considering wear condition, Advances in Mechanical Engineering, (2019), vol. 11, No. 12, pp. 1-20, DOI:10.177/1687814019894452. journals.sagepub.com/home.ade.
Liu, Weiji et al., A New Approach of rock Cutting Efficiency Evaluation by using Plastic Energy Dissipation Ratio, KSCE Journal of Civil Engineering, (2019), vol. 23, pp. 879-888, Korean Scoiety of Civil Engineers, DOI 10.1007/s12205-108-0100-0.
Detournay, E et al., A Phenomenological Model for the Drilling Action of Drag Bits, International Journal of Rock Mechanics and Mining sciences & Geomechanics Abstracts, (1992), vol. 20, No. 1, pp. 13-23, Printed in Great Britain, Pergamon Press plc.
Zhou, Yaneng et al., Mechanical specific energy versus depth of cut in rock cutting and drilling, International Journal of Rock Mechanics and Mining Sciences, 100, (2017), pp. 287-297, www.elsevier.com/locate/ijrmms.
Akono, A-T, et al., Scratching as a Fracture Process: From Butter to Steel, Physical review letters, (2011), vol. 106, No. 20, p. 204302-1-204302-4, American Physical Society, DOI: 10.1103/PhysRevLett.106.204302.
ATSM International. StandardTest Method for Unconfined Compressive Strength of Cohesive Soil, ASTM International, Tech. Rep. Astm D2166, (2016), pp. 1-6.
Ghoshouni, M. et al., Effect of the Back Rake Angle and Groove Geometry in Rock Cutting, ISRM International Symposium-Asian Rock Mechanics Symposium, ISRM, (2008), ISRM-ARMS5, Nov. 24-26, 2008 Tehran, Iran.
Menezes, Pradeep L., Influence of rock mechanical properties and rake angle on the formation of rock fragments during cutting operation, The International Journal of Advanced Manufacturing Technology, (2017), vol. 90, pp. 127-139, Springer-Verlag London, DOI: 10.1007/s00170-016-9342-5.
Richard, T., et al., Rock strength determination from scratch tests, Engineering Geology, vol. 147-148, (2012), pp. 91-100, Elsevier B.V., www.elsevier.com/locate.enggeo.
Sowlat, Iman Rostam, Effect of cutter and rock properties on the frictional contact in rock cutting with blunt tools, Ph.D. dissertation, Curtin University, (2017).
Rostamsolat, Iman et al., An experimental study of the effect of back rake angle in rock cutting, International Journal of Rock Mechanics and Mining Sciences, vol. 107, (2018), pp. 224-232, Elsevier Ltd., www.elsevier.com/locate/ijrmms.

* cited by examiner

DRILLING APPARATUS, DRILL BIT, AND METHOD FOR TESTING DRILL BIT PERFORMANCE

CROSS-REFERENCE TO RELATED APPLICATIONS

This application claims the benefit of priority of U.S. Provisional Application Ser. No. 63/556,197 filed on Feb. 21, 2024 and entitled "Anglewing Clam Inspired Drill Bit" and U.S. Provisional Application Ser. No. 63/567,015 filed on Mar. 19, 2024 and entitled "Anglewing Clam Inspired Drill Bit and Method," the content of each of which is relied upon and incorporated herein by reference in their entirety.

GOVERNMENT FUNDING

This invention was made with government support under EEC-1449501 awarded by the National Science Foundation. The government has certain rights in this invention.

BACKGROUND

The disclosure relates generally to a drilling apparatus, drill bit, and method for testing the performance, including the cutting efficiency, of a drill bit that can be used for drilling into rock or the like.

Drilling in rock plays a pivotal role in resource exploitation and recovery, infrastructure construction, geo-hazards safeguard and rescue, environment protection, and scientific exploration in deep underground, marine, or even extraterrestrial environments. The advent of advanced technologies for hard rock drilling and excavation has significantly contributed to the formulation of powerful and cost-effective methodologies. These methodologies have proven instrumental in oil and gas recovery, mining, tunnels/utility/sewage/water supply systems construction, nuclear disposal, and geological carbon sequestration, for example. To further improve the drilling technology, more durable drill bits, enhanced penetration rates, and heightened autonomy are desired, all of which collectively serve to improve efficiency, mitigate costs and bolster safety measures. Polycrystalline Diamond Compact (PDC) drill bits are a foundational element in rock drilling engineering, where features thereof, such as bit profile shape, nozzle and water channel arrangement, and cutter characteristics can significantly impact performance. An accurate way of testing cutting performance of such drill bits, particularly in a laboratory setting, is needed for advancing and improving the design of the PDC drill bits.

SUMMARY

An aspect of this disclosure is a drilling apparatus for testing drill bit performance that may comprise a frame, a drill bit component supported by the frame, a vertical load mechanism supported by the frame above the drill bit component, and a sample container for holding a substrate material. The sample container may be coupled to the vertical load mechanism. A rotary motion assembly can be operatively coupled to the drill bit component. The rotary motion assembly can be configured to rotate the drill bit component. The vertical load mechanism can be configured to move the sample container downwardly at a constant displacement rate with respect to the frame and toward the drill bit component, while the rotary motion assembly rotates the drill bit component.

In certain examples, the drill bit component has a plurality of cutters; the cutters of the drill bit component have a −30° rake angle or a +30° rake angle, or the cutters are vertical with 0° rake angle; the plurality of cutters of the drill bit component have a shape that is substantially the same as cutters of a PDC drill bit; the drill bit component is formed of plastic material; and/or the plastic material is a polylactic acid material.

In some examples, the sample container holds the substrate material and has an open bottom facing toward the drill bit component that provides access to the substrate material; and/or the sample container holds the substrate material, and the substrate material is a paraffin wax.

In an example, the rotary motion assembly may comprise a stepper motor and a gear box, and the stepper motor can be operatively connected to the drill bit component in order to rotate the drill bit component.

In other embodiments, the drilling apparatus may further comprise a torque sensor connected to the drill bit component and connected to the rotary motion assembly for measuring the torque being applied to the drill bit component by the rotary motion assembly; the torque sensor can be connected to the drill bit component by a rigid coupling and is connected to the rotary motion assembly by a flexible coupling; and/or the rigid coupling may comprise a rigid shaft and the flexible coupling comprises a flexible shaft.

In some examples, the vertical load mechanism may comprise a load support and a load cell attached to the load support, wherein the load cell is coupled to a top of the sample container; and/or the load support can be configured to be vertically moveable with the respect to the frame to move the sample container downward toward the drill bit component.

In an example, a method of using the drilling apparatus wherein the substrate material is held in the sample container, and the method may comprise moving, via the vertical load mechanism, the sample container vertically downward at the constant displacement rate until the drill bit component penetrates the substrate material while the drill bit component can be rotated by the rotary motion assembly.

Another aspect of the present disclosure is a method of testing drill bit performance that may comprise moving a substrate material vertically downward toward a drill bit component at a constant displacement rate; rotating the drill bit component while moving the substrate material vertically downward toward the drill bit component until the drill bit component penetrates the substrate material; then recording data from the drill bit component penetrating the substrate material including weight-on-bit, cutting depth per revolution, and reactive torque; and analyzing a cutting performance of the drill bit component based on the recorded data to decipher the cutting and frictional contact response of the drill bit component.

In certain embodiments, the substrate material comprises paraffin wax and the drill bit component comprises a polylactic acid plastic material; the method further comprises 3D printing the drill bit component to have a shape and cutters that mimic a shape and cutters of a PDC drill bit; a vertical load mechanism applies force to a sample container holding the substrate material to move the sample container and substrate material toward the drill bit component until the drill bit component penetrates the substrate material; and/or a rotary motion assembly operatively coupled to the drill bit component rotates the drill bit component, and a torque sensor measures a torque of the drill bit component applied by the rotary motion assembly.

Yet another aspect of the present disclosure is a drill bit that may comprise a body that has one or more blades extending outwardly from the body, and a plurality of cutters that can be arranged on the one or more blades. Each of the plurality of cutters can have a cutting face that is configured for interfacing with a surface to be drilled. Each of the plurality of cutters can have a 0° rake angle. And each of the cutting faces can be curved.

In some examples, each of the plurality of cutters is formed of a synthetic diamond material; the body is formed of steel or a steel composite; and/or the plurality of cutters are evenly spaced from one another and each of the plurality of cutters has a portion that is embedded in an edge of the one or more blades.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
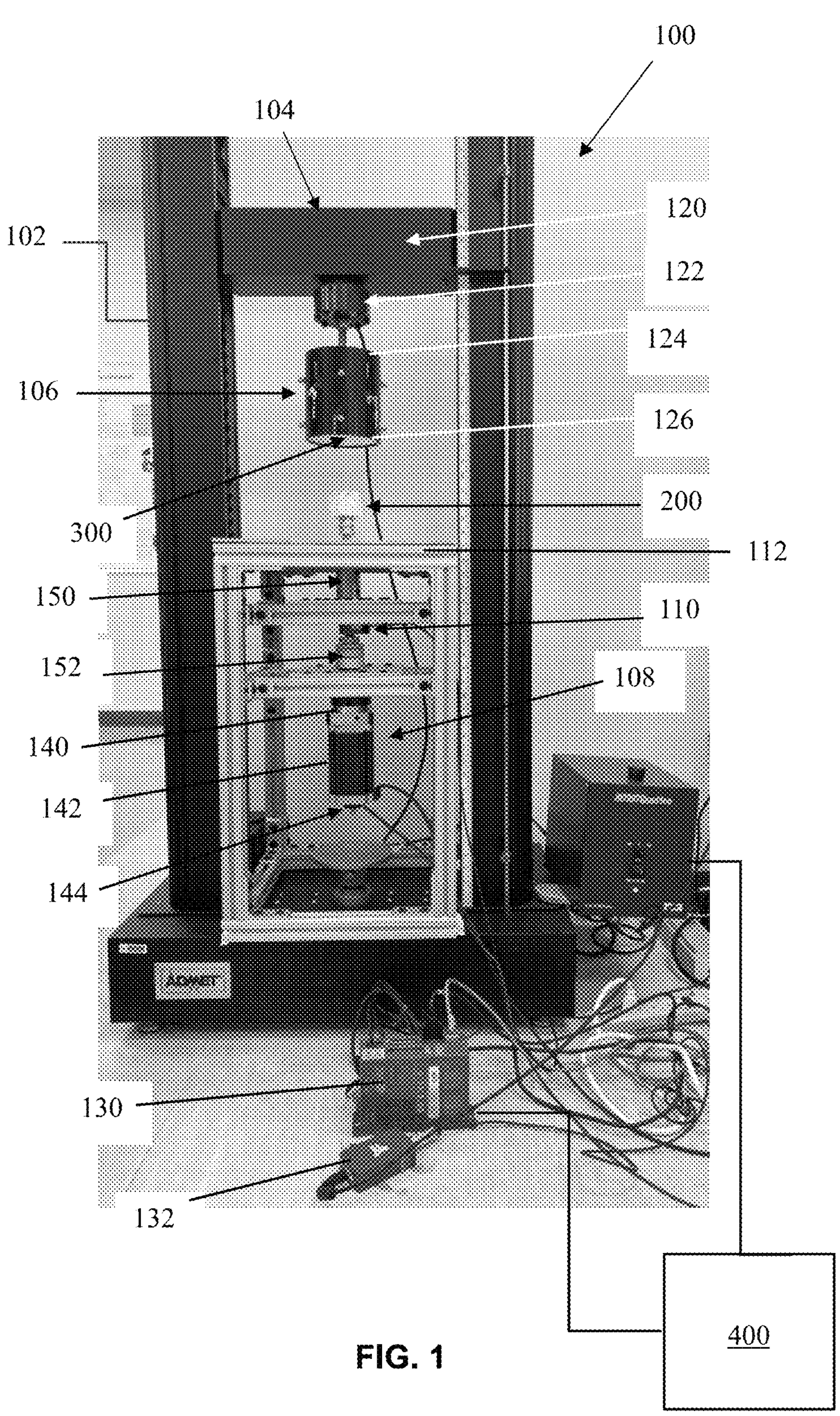
FIG. 1 is a front view of an exemplary drilling apparatus, according to one example of the present disclosure.

The present disclosure may relate to a drilling apparatus for testing drill bit performance. The drilling apparatus may be built for use in a laboratory setting. The drilling apparatus may generally comprise a frame, a drill bit component to be tested that is supported by the frame, a vertical load mechanism supported by the frame above the drill bit component, and a sample container for holding a substrate material. The sample container can be coupled to the vertical load mechanism. A rotary motion assembly can be operatively coupled to the drill bit component, and the rotary motion assembly can be configured to rotate the drill bit component. The vertical load mechanism can be configured to move the sample container downwardly at a constant displacement rate with respect to the frame and toward the drill bit component, while the rotary motion assembly rotates the drill bit component.

The present disclosure may also relate to a method of using the drilling apparatus where the substrate material is held in the sample container, and the method may comprise moving, via the vertical load mechanism, the sample container vertically downward at the constant displacement rate until the drill bit component penetrates the substrate material while the drill bit component is being rotated by the rotary motion assembly.

The present disclosure may yet further relate to a method of testing drill bit performance that may comprise moving a substrate material vertically downward toward a drill bit component at a constant displacement rate; rotating the drill bit component while moving the substrate material vertically downward toward the drill bit component until the drill bit component penetrates the substrate material; then recording data from the drill bit component penetrating the substrate material including weight-on-bit, cutting depth per revolution, and reactive torque; and analyzing a cutting performance of the drill bit component based the recorded data using the Detournay model (discussed in more detail below) to decipher cutting and frictional contact response of the drill bit component.

It is to be understood that the figures and descriptions of the present disclosure may have been simplified to illustrate elements that are relevant for a clear understanding of the present disclosure, while eliminating, for purposes of clarity, other elements known to those of ordinary skill in the art. Those of ordinary skill in the art will recognize that other elements may be desirable and/or required in order to implement the present disclosure. However, because such elements are well known in the art, and because they do not facilitate a better understanding of the present disclosure, a discussion of such elements is not provided herein. It is also to be understood that the drawings included herewith only provide diagrammatic representations of the presently preferred structures of the present disclosure and that structures falling within the scope of the present disclosure may include structures different than those shown in the drawings. Reference will now be made to the drawings wherein like structures are provided with like reference designations.

Before explaining at least one example in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, systems, methods, features, and advantages will be or become apparent to one with skill in the art upon examining the drawings and the detailed description herein. It is intended that all such additional devices, systems, methods, features, and advantages be protected by the accompanying claims.

Certain features of PDC drill bits, such as bit profile shape, nozzle and water channel arrangement, and cutter characteristics (including shape, type, and orientation) can significantly impact cutting performance of a PDC drill bit. For example, studies have revealed that the strength at which rock breaks decreases with an increase in the outer cone curvature of the bit crown of the bit, while it increases with an increase in the inner curvature of the bit crown. As for the cutters of the drill bit, cutting efficiency decreases as the negative rake angle is enlarged.

The rake angle is the angle between the face of the cutter and the surface of the rock being drilled. A negative rake angle means that the face of the cutter is tilted backward such that the cutter face creates a negative rake angle. A negative rake angle is less aggressive but can provide better stability and durability, reducing the wear on the cutters. A positive rake angle means that the cutter face is tilted forward such that the cutter face creates a positive rake angle. That configuration is generally more aggressive and can cut through rock more efficiently but can lead to higher wear rates on the cutters. A neutral rake angle means that the cutter face is perpendicular to the rock surface, such that it creates a neutral or vertical rake angle. That balance can offer a compromise between cutting efficiency and durability. An optimal rake angle helps in reducing the cutting force and energy required to cut through the rock, which can make the drilling process more efficient. Proper rake angles can facilitate better rock chip removal, preventing clogging and ensuring smoother drilling operations. Optimizing the rake angle can also enhance the lifespan of the drill bit by reducing wear and tear.

The optimization of cutters of a drill bit reduces the lateral force to Weight-On-Bit (WOB) ratio and the bending moment to torque ratio, which not only helps mitigate unwanted whirl and tilt but also enhances drilling efficiency significantly. The lateral force to WOB ratio measures the side forces acting on the drill bit relative to the downward force applied. Reducing this ratio can help in stabilizing the bit and minimizing unwanted lateral movements. The bending moment to torque ratio compares the bending forces acting on the bit to the rotational force (torque). Lowering that ratio can help in reducing the bending stresses on the bit, leading to smoother drilling. Whirl refers to the erratic, circular motion of the drill bit and tilt refers to the bit deviating from its intended path. Optimizing the design of the cutters can help in reducing these unwanted movements, leading to more stable and controlled drilling. And by reducing lateral forces and bending moments, the drill bit can drill more effectively and with less wear.

Cutting depth, or the cutting depth per revolution in the context of PDC rotary drilling, also affects the drilling performance. Experimental data along with theoretical analysis shows that the value of the optimum cutting depth is associated with the highest drilling efficiency as well as the lowest plastic energy dissipation ratio.

To analyze the cutting performance of PDC bits, Detournay et al. introduced a conceptual model that initially focused on a single cutter and later extended to an entire drill bit. That model (referred to herein as the "Detournay model") considered both the cutting force at the front of a flat cutter and the frictional contact at the wear flat. By assuming that the cutting force is proportional to the cutting contact area, the Detournay model establishes relationships between WOB, reactive torque T, and cutting depth per revolution d. The Detournay model identifies three drilling phases based on the cutting depth per revolution d. When d is small, the cutting effort is primarily dissipated through frictional contact, compromising efficiency. As d increases, cutting assumes a predominant role over friction, resulting in more efficient drilling. However, a further increase in d beyond a threshold leads to cutting clogging and bit balling up, resulting in a non-unique WOB-T-d response. That not only decreases drilling efficiency but also increases the risk of drill bit damage.

Several alternative models have been proposed to elucidate cutter-rock interactions. Zhou et al. introduced a model that correlates specific energy with the depth of cut for a circular cutter. That model takes into account the evolution of the wear flat with cutting depth, extending Detournay model. On a similar note, Gerbaud et al. proposed a model based on the presence of a build-up edge of crushed materials on the cutting face. That model considers the forces applied on the back of the cutter, as well as those due to rock deformation and the backflow of crushed materials.

The present disclosure relates to a drilling apparatus 100 configured to test the performance of drill bits based on their cutter designs. In general, drilling apparatus 100 is configured to incorporate penetration loading, rotary drilling motion, as well as monitoring of WOB and torque of the drill bit being tested. A drill bit component 200 that mimics a PDC drill bit can be tested using drilling apparatus 100. Drill bit component 200 can be crafted from a material, such as a Polylactic Acid (PLA) material, to have the shape that mimics a PDC drill bit with a selected cutter designs (cutters with +30° rake angle, cutters with −30° rake angle, and vertical cutters. Using drilling apparatus 100, drill bit component 200 can be drilled into a substrate material, such as a paraffin wax sample, that essentially mimics the properties of a substrate, such as rock or the like, for testing in a laboratory setting. A control 400 can be used to record data resulting from the operation of drilling apparatus 100 including data associated with WOB, reactive torque and cutting depth per revolution. The recorded data obtained from this drilling operation can then be analyzed using the Detournay model, thereby deciphering cutting and frictional contact responses of drill bit component 200. That analytical approach offers valuable insights for comparing the performance of various drill bits and their cutter designs, shedding light on their relative efficiencies. Furthermore, the findings of the present disclosure provide valuable insights for refining PDC cutter designs.

To test the performance of rock drill bits in the lab, drilling apparatus 100 can be designed and assembled to fulfill the function of both vertical and rotary loading, controlling, and monitoring. FIG. 1 shows a photograph of drilling apparatus 100 according to an example of the present disclosure. In general, drilling apparatus 100 can be designed to simulate drilling rock or the like using a PDC drill bit. Drilling apparatus 100 can comprise a frame 102, a vertical load mechanism 104, a sample container 106, a rotary motion assembly 108, and a torque sensor 110. Drill bit component 200 (that is to be tested using drilling apparatus 100) can be supported by a platform 112 of frame 102. And a substrate material 300 (into which drill bit component 200 will drill during testing) can be held in sample container 106.

Vertical load mechanism 104 can provide vertical loading in connection with drilling apparatus 100. Vertical load mechanism 104 can be configured to conduct displacement and load-controlled testing up to a predetermined load capacity, e.g. 50 kN. An ADMET eXpert 2613 Dual Column Testing Machine, for example, can be used for the vertical loading when operating the drilling apparatus. Vertical load mechanism 104 may comprise a load cell 120 that can be attached to an upper load support 122. Load cell 120 can also be connected to sample container 106 such that load cell 120 is between load support 122 and sample container 106 with load support 122 being above load cell 120 and sample container 106 being below load cell 120.

Sample container 106, which holds substrate material 300, can be attached below the load cell 120. Sample container 106 can be fixed with respect to load cell 122 such that sample container 106 cannot be rotated. In an example, a top 124 of sample container 106 is attached to load cell 122 by one or more screws or the like. Sample container 106 can be filled with the substrate material 300 to be drilled by the drill bit component 200 being tested. In an example, the substrate material 300 can be a solid paraffin wax. A bottom 126 of sample container 106 can be open to allow drill bit component 200 access and ultimately penetrate to the substrate material 300.

When operating drilling apparatus 100 to conduct a test on drill bit component 200, load support 122 of vertical load mechanism 104 can be configured to apply force to bring sample container 106 vertically downward at a constant displacement rate toward platform 112 to allow drill bit component 200 to bore into the substrate material 300. In other words, load support 122 can move sample container 106 downwards at a steady speed, allowing drill bit component 200 to penetrate into the substrate material 300.

Rotary motion assembly 108 can be arranged at the base of drilling apparatus 100 and can be configured to rotate the drill bit component 200. Rotary motion assembly 108 may comprise a stepper motor 140 and a gear box 142. Stepper motor 140 can be connected to gearbox 142 which can change the speed and force of the stepper motor's spin. Together, they can produce torque to be applied to drill bit component 200.

Rather than spinning continuously like a regular motor, the stepper motor 140 can rotate in steps or fixed increments to allow for accurate control of the motor's position. Stepper motor 140 can be an Applied Motion HT34-697 stepper motor, for example. Stepper motor 140 can be fixed to the platform 112, coupled with gear box 142. Gear box 142 can be an Applied Motion 80PE010-SSAH4 gearbox of 10:1 gearhead ratio, meaning the gear box 142 can reduce the stepper motor's speed by a factor of 10 while increasing torque. Gear box 142 can also include an encoder 144 to provide feedback and control the stepper motor's position and speed. In an example, rotary motion assembly 108 combining stepper motor 140 and gear box 142 can generate rotary torque of more than 100 N·m at 0.1 RPS (100 Newton-meters of torque when spinning at 0.1 revolutions per second) and 30 N·m at 2 RPS (30 Newton-meters of torque when spinning at 2 revolutions per second).

With the embedded encoder 144, rotary motion assembly 108 can be provided with closed-loop feedback control, including to control 400. The encoder 144 can be included to provide feedback and accurately control the system and operation of the rotary motion assembly 108. Rotary motion assembly 108 can be connected with a motor drive 130 that powers the assembly. Motor drive 130 can be an Applied Motion STAC6-Q motor drive, for example.

Torque sensor 110 can be used to measure the rotation force of drill bit component 200 as applied by rotary motion assembly 108 and ensure drilling apparatus 100 is working correctly. Torque sensor 110 can be arranged between drill bit component 200 and rotary motion assembly 108 to measure the torque produced by rotary motion assembly 108. Torque sensor 110 can be arranged above rotary motion assembly 108 and below drill bit component 200. Torque sensor 110 can be connected to drill bit component 200 and rotary motion assembly 108 via first and second couplings 150 and 152. First coupling 150 can be a rigid coupling and a second coupling 152 can be a flexible coupling. That setup ensures precise measurement and control of the drill bit component's rotational force.

Torque sensor 110 can have two parts (e.g. two shafts) that can rotate freely, and these parts are connected to the rest of the system using first and second couplings 150 and 152. The couplings 150 and 152 help ensure drill bit component 200, rotary motion assembly 108, and torque sensor 110 stay aligned and work smoothly. In an example, torque sensor 110 can be a Futek TRS605 non-contact shaft-to-shaft rotary torque sensor of maximum capacity 20 N·m. Torque sensor 110 can be connected to a torque sensor drive 132 for operating and powering the torque sensor 110.

First or rigid coupling 150 can be connected to torque sensor 110 with a shaft that is directly connected to drill bit component 200. Second or flexible coupling 152 can be, for example, a servoclass SC050 clamping precision flexible shaft coupling. Second or flexible coupling 152 is configured to handle any misalignments in parallel, axial, and angular directions in the connection between torque sensor 110 and rotary motion assembly 108. The rigid coupling 150 can have two different bore sizes matching the shaft diameter of the torque sensor 110 and the drill bit component 200. Two set screws can be used to secure each shaft. The flexible coupling 152 can be a beam coupling that allows clamping onto two different-sized of shafts between torque sensor 110 and rotary motion assembly 108.

Drilling apparatus 100 can be designed to work with 3D drill bit components that have a shape similar to a PDC drill bit to mimic a PDC drill bit, including the cutters of the PDC drill bit. In an example, drill bit component 200 can be formed by 3D-printing using a plastic material. In an example, drill bit component 200 can be fabricated using a plastic material, such as a polylactic acid material (PLA) material. In an example, drill bit component 200 can be printed with an infill density of 40%, a resolution of 0.15 mm, and a shell thickness of 1.2 mm.

Substrate material 300 can be any material that is compatible with the material, e.g. PLA plastic, of the 3D-printed drill bit component 200, such as a material that has a hardness of about 1/10-1/5 of the hardness of the material of the drill bit component 200. In an example, the substrate material 300 can be paraffin wax. Paraffin wax demonstrates thermal stability and behaves as nearly linear elastic. Although paraffin wax is disclosed as the substrate material 300 and PLA plastic as the drill bit component 200, other materials can be used as the substrate material 300 and the drill bit component 200, as long as their hardness ratio is kept at about 1/10-1/5.

Experiment

Figures 2A, 2B, 2C:
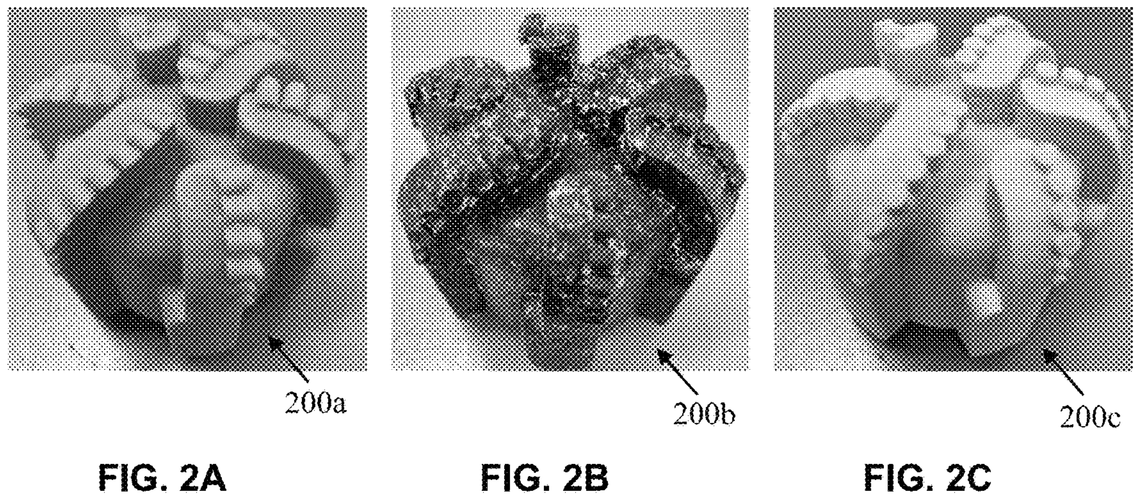
FIGS. 2(*a*)-2(*c*) are perspective views of various drill bit components (e.g. +30° cutter rake angle, −30° cutter rake angle, and vertical cutter) for testing using the drilling apparatus illustrated in FIG. 1.

A laboratory drilling apparatus 100 was built that is capable of controlling vertical displacement and rotary speed. Vertical loading and rotary torque were monitored during the experiment. Three drill bits 200*a* (FIG. 2A), 200*b* (FIG. 2B), and 200*c* (FIG. 2C) were 3D printed using PLA material and paraffin wax was selected as the substrate material 300 considering its soft and brittle nature. The results from the experiments (explained in detail below) were as follows:

- At a constant rotary RPS, reactive torque and Weight-On-Bit (WOB) increase with penetration rate but the incremental is decreasing; and at a constant penetration rate, reactive torque and WOB decrease with RPS and reach plateaus above 1-1.5 mm/s.
- The cutter-wax substrate interaction is rate-independent, torque and WOB depend on penetration depth per revolution d, which does not distinguish the impact from solely revolution rate and penetration rate.
- The Detournay model can be applied to fit the lab drilling data on paraffin wax. Two phases were observed in experimental data for all three drill bit components: phase 1 is dominant by friction while cutting plays a more significant role in phase II, which is desired for it higher cutting efficiency.
- The vertical drill bit with the curved cutting surface 200*c* displayed higher efficiency in cutting compared with the +30° and −30° drill bit components 200*a* and 200*b*.

A summary of the fitted drilling parameters for the three drill bit components 200*a*, 200*b*, and 200*c* is shown in Table 1 below.

TABLE 1

| Drill bit | +30° | −30° | Vertical with curved surface |
|---|---|---|---|
| $w^*$ [N/mm] | 24.2 | 22.1 | 18.5 |
| $t^*$ [N/mm] | 3.9 | 4.5 | 3.7 |
| $w_f^*/w^*$ | 0.93 | 0.93 | 0.89 |
| $t_f^*/t^*$ | 0.90 | 0.87 | 0.84 |
| ε [MPa] | 2.07 | 2.20 | 2.38 |

The smallest $w^*$ and $t^*$ (shown in Table 1 as the vertical bit component 200*c*) indicate early transition to phase II (i.e., constant friction and cutting becomes dominant); and the lowest $w_f^*/w^*$, $t_f^*/t^*$, and highest ε (shown in Table 1 as the vertical bit component 200*c*) indicate the highest efficiency.

Figures 3A, 3B:
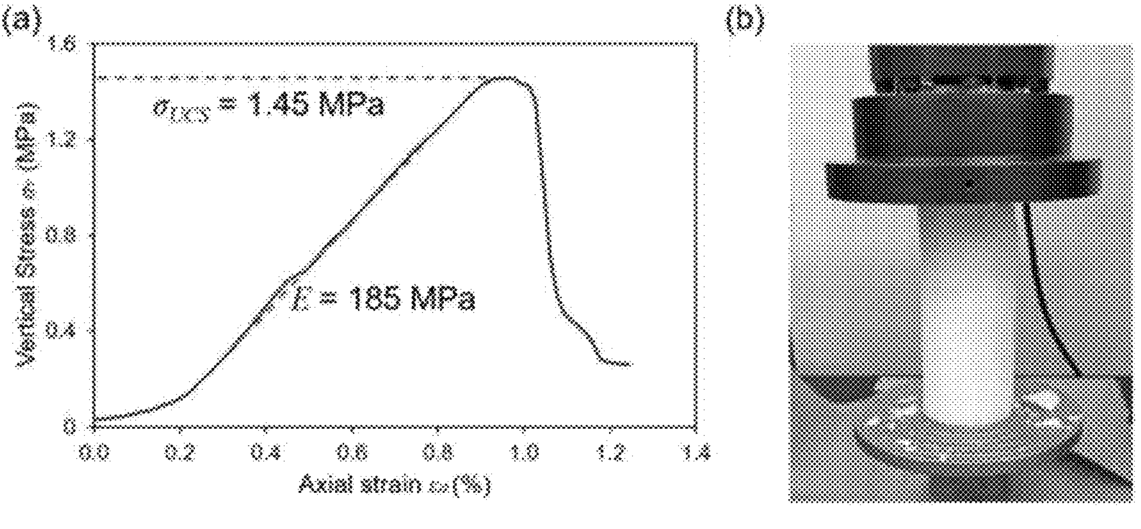
FIG. 3(*a*) is a graph showing the stress-strain relationship under compression testing of a substrate material and FIG. 3(*b*) shows a sample of the substrate material post brittle failure from compression testing.

Before testing, the substrate material or paraffin wax 300 was liquefied at 70° C. and poured into a mold with dimensions of 130 mm in diameter and 130 mm in height and left to cool to room temperature. Preliminary drilling tests confirmed that the solidified wax exhibited consistent mechanical properties. An additional Uniaxial Compressive Strength (UCS) test was conducted on a 60.0 mm in diameter and 138.3 mm in height wax column at a loading rale of 1.4 mm/min to quantify the basic mechanical properties of the sample. The Uniaxial Compressive Strength $\sigma_{ucs}$=1.45 MPa. and the Young's Modulus E=185 MPa. per ASTM standard. FIG. 3A shows the stress-strain curve of the paraffin wax sample, indicating a relative brittle failure mode, which is also confirmed by the post-failure image shown in FIG. 3B.

In the experiment, the three drill bit components 200*a*, 200*b*, and 200*c*, featuring distinct cutter designs were compared using drilling apparatus 100 to conduct laboratory drilling experiments and testing. Drill bit component 200*a* (FIG. 2A) has a +30° rake angle of its cutters, drill bit component 200*b* (FIG. 2B) has a −30° rake angle of its cutters, and drill component 200*c* (FIG. 2C) has vertical cutters with a 0° rake angle and a curved cutter surface.

Figures 4A, 4B, 5A, 5B, 5C, 5D:
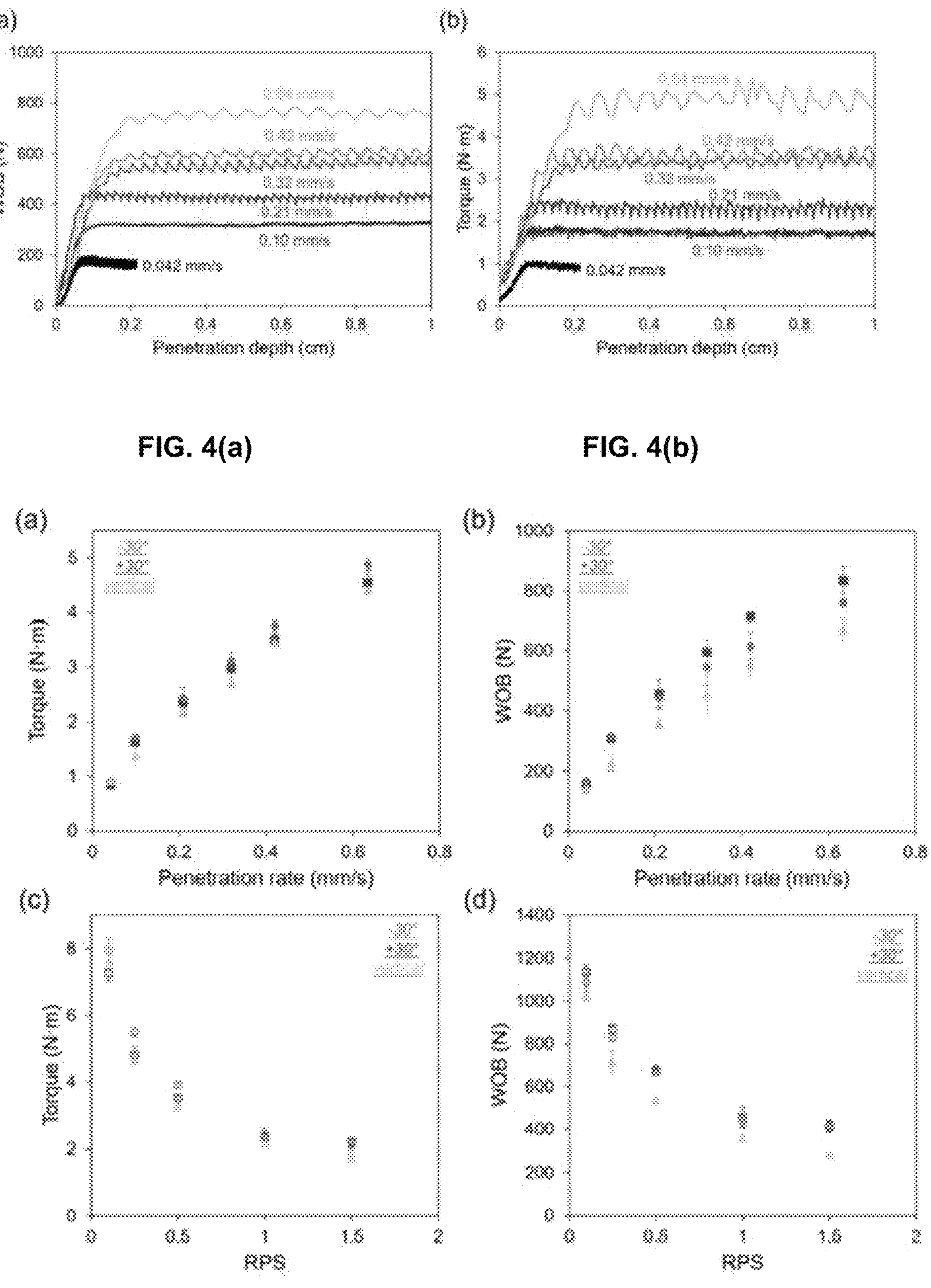
FIGS. 4(*a*) and 4(*b*) are graphs of experimental data exemplified using a −30° drill bit component rotating at 1 RPS and varied penetration rate, FIG. 4(*a*) showing Weight-On-Bit (WOB) versus penetration depth, and FIG. 4(*b*) showing reactive torque versus penetration depth.
FIGS. 5(*a*)-5(*d*) are graphs showing a comparison of the drilling responses of three different drill bits components (+30° cutter rake angle, −30° cutter rake angle, and vertical cutter), FIGS. 5(*a*) and 5(*b*) showing torque and WOB responses at varied penetration rates and constant revolution rate of 1 RPS, and FIGS. 5(*c*) and 5(*d*) showing torque and WOB responses at varied RPS and constant penetration rate of 0.21 mm/s.

FIGS. 4A and 4B are graphs showing the recorded raw experimental data of two sets of tests. The graph of FIG. 4A shows WOB versus penetration depth and the graph of FIG. 4B shows reactive torque versus penetration depth. In the first set, the revolution rate was held constant at 1 RPS while the penetration rate was varied at 0.042, 0.10, 0.21, 0.32, 0.42, and 0.64 mm/s. In the second set, the revolution rate varied from 0.1 to 0.25, 0.5, 1, and 1.5 RPS while the penetration rate remained constant at 0.21 mm/s. Each case was repeated at least five times to ensure statistical reliability. Throughout both sets of experiments, reactive torque and the WOB were simultaneously monitored. FIGS. 4A and 4B illustrate the WOB and torque responses concerning penetration depth for drilling experiments using a −30° drill bit component 200*b*, for example, at varied penetration rates and a constant revolution rate of 1 RPS. Upon full contact with the substrate material (e.g. paraffin wax), WOB and torque reached plateaus.

The WOB and torque results after reaching the plateaus as seen in FIGS. 4A and 4B were extracted for each test and plotted in FIGS. 5A-5D. FIGS. 5A and 5B show the torque and WOB versus penetration rates at 1 RPS for all three drill bit components 200*a*, 200*b*, and 200*c*. Both the torque and WOB increase with the penetration rate but the incremental rate decays. At the same penetration rate, the drill bit component 200*b* with −30° rake angle of cutters showed higher reactive torque and lower WOB than the drill bit component 200*a* with +30° rake angle of cutters. Thus, the drill bit component 200*b* with a negative back rake angle requires a larger effort to cut the substrate. However, a negative rake angle could remove more substrate beneath the cutter, thus reducing the WOB. The vertical drill bit component 200*c* exhibits both lower torque and WOB than the other two bit components 200*a* and 200*b*.

FIGS. 5C and 5D display the torque and WOB responses for all drill bit components 200*a*, 200*b*, and 200*c* at a constant penetration rate of 0.21 mm/s and varied revolution rates. As the drill bit component spun faster, both the reactive torque and WOB decreased, reaching a seemingly low plateau after about 1-1.5 RPS. Comparing the torque and WOB responses for the two drill bit components 200*a* and 200*b* with +30 and −30° rake angles at the same RPS yields the same result as the penetration rate-controlled tests. At a given revolution rate, the torque is higher for the negative rake angle bit while the WOB is lower. Torque and WOB are also the lowest for the vertical drill bit component 200*c* with one outlier of torque response at RPS=0.25 in FIG. 5C.

Figure 6:
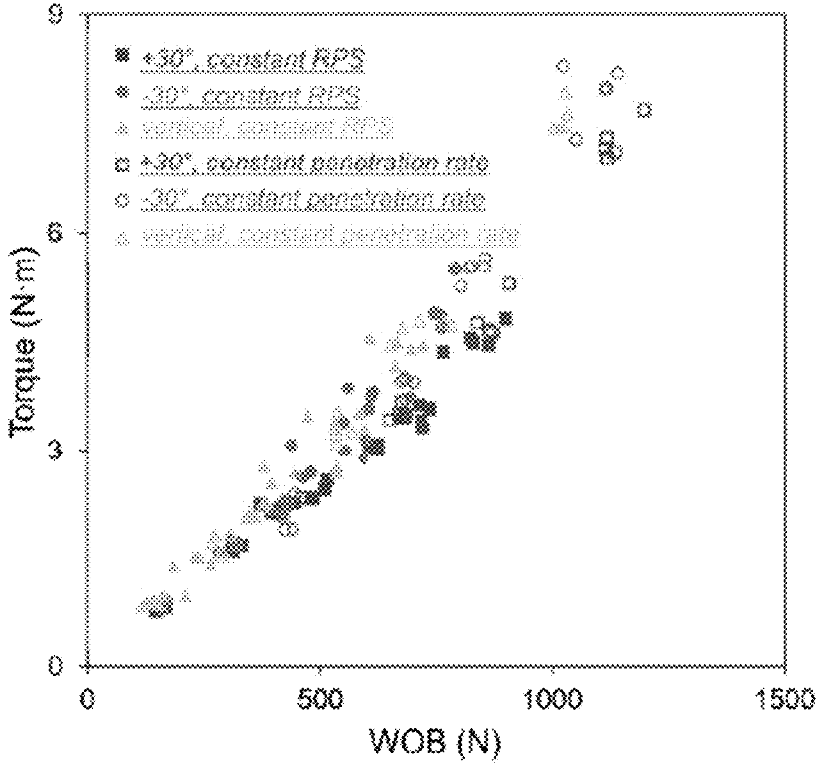
FIG. 6 is a graph showing a comparison of the three drill bit components (e.g. +30° cutter rake angle, −30° cutter rake angle, and vertical cutter) under constant RPS and constant penetration rate showing a rate-independent drilling response.

Each of the tests were analyzed by four variables, namely, torque T [N·m], WOB [N], revolution rate N [revols/s], and penetration rate v [m/s]. To simplify the analysis, a variable was introduced called depth of penetration per revolution d. Apparently, d=v/N. FIG. 6 is a graft of the comparison of drill bit components 200*a*, 200*b*, and 200*c* under constant RPS and constant penetration rate showing a rate-independent drilling response. In FIG. 6, the solid markers are torque—WOB data conducted at a constant revolution rate while the hollow markers are at a constant penetration rate. FIG. 6 demonstrates that although the torque-WOB does not overlap among the individual drill bit components 200*a*, 200*b*, and 200*c*, revolution rate-controlled and penetration rate-controlled data do overlap each other. Thus, the bit-substrate interaction was rate-independent. Hence, only three parameters, T, WOB. and d are needed for analysis. FIG. 6 also shows that at a same WOB, the +30° drill bit component 200*a* cut the substrate with the least torque. The −30° drill bit component 200*b* showed similar responses with only slightly reduced torque compared to the vertical counterpart.

Figure 7:
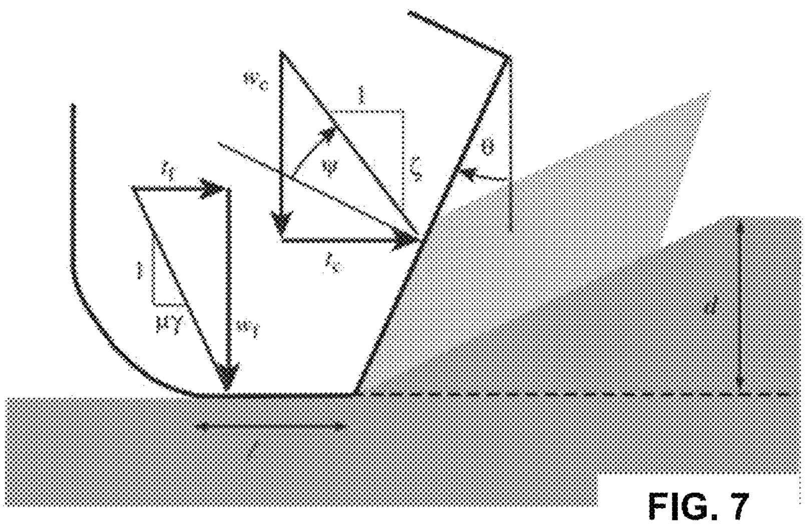
FIG. 7 is a graph showing decomposition of t and w into forces transmitted by the cutting face $t_c$, $w_c$ and the frictional face $t_f$, $w_f$ according to the Detournay model.

Analysis of the data obtained from the testing was conduct using the Detournay model. The Detournay model analyzes the cutting behavior of drag bits (or PDC bits as they are often referred to) and showed great agreement with experimental results. The Detournay model utilizes WOB, torque T and depth of penetration per revolution d to uncouple the pure cutting and frictional process and is able to derive cutting efficiency. The Detournay model assumes that the bit-rock interface law is rate-independent. Along with the cut per revolution d, a scaled weight-on-bit w and torque t are introduced to replace WOB, and T for the sake of eliminating the bit size effect:

$$w = \frac{WOB}{a},\ t = \frac{2T}{a^2}$$

where a is the bit radius. Both t and w can be decomposed into the cutting and frictional forces (FIG. 7).

$$t = t_c + t_f,\ w = w_c + w_f.$$

One assumption made is that the cutting components are proportional to d as:

$$t_c = \varepsilon d,\ w_c = \zeta \varepsilon d$$

where $\epsilon$ is the intrinsic specific energy dictating the energy required to remove a unit volume of the substrate with pure cutting, no friction. Experiments show that $\epsilon$ is correlated to the uni-axial compressive strength q of the substrate and bit geometry such as back rake angles $\zeta$ is a proportional coefficient.

With regard to the frictional component, $$t_f = \mu y w_f$$

where $\mu$ is the coefficient of friction and a constant $\gamma$ is introduced to incorporate the influence of bit geometry, for example, the cutter distribution on the bit. Now. with $\zeta$ and $\mu y$ the cutting and frictional component of t and w can be derived:

$$t_c = \frac{t - \mu\gamma w}{1-\beta},\ w_c = \zeta t_c$$

-continued $$w_f = \frac{w - \zeta t}{1-\beta},\ t_f = \mu\gamma w_f$$

with $\beta=\mu\gamma\zeta$. A linear relationship among w, t and d is yielded:

$$t = (1-\beta)\varepsilon d + \mu\gamma w$$

further adjust this equation by dividing t and w by d:

$$E = E_0 + \mu\gamma S$$

where $E_0=(1-\beta)\varepsilon$, and E=t/d, S=w/d. E and S are referred to as specific energy and drilling strength, both of which have the dimension of stress.

Now that the relationship among t, w and d has been established, the Detournay model further derived the relationship between d-w, d-t and t-w, individually. Two phases of cutting related to d are proposed:

When d is small (phase I), the frictional component of the weight. $w_f$ is assumed to be proportional to d. That is because the scaled length of the cutter surface in frictional contact with the substrate increases as d deepens, while the strength of the substrate at failure is assumed to be a constant $\sigma$. Thus.

$$w_f = \sigma\kappa d$$

where k represents the proportion of the frictional contact surface and the cut depth. From here, combining the equations leads to a linear relationship between W and d:

$$w = S_* d$$

where $$S_* = \zeta\varepsilon + \kappa\sigma$$

The relationship between t and d is also linear:

$$t = E_* d$$

where $$E_* = \varepsilon + \mu\gamma\sigma\kappa$$

and finally, the linear relationship between t and w can be derived:

$$t = \mu\gamma' w$$

where $$\gamma' = \frac{\gamma}{1 - \frac{E^0}{E_*}}$$

Note that if $E_0$ is much smaller than $E_*$, $\gamma' \simeq \gamma$, meaning that the slope of t-w relationship in phase I is close to the slope of E-S. That further indicates that the bit response is almost purely frictional.

As d increases, in phase II. the frictional forces are fully mobilized and do not change, $w_f = w_{f*}$ and $t_f = t_{f*}$. Any further increase of w and t will be only from the cutting front $w_c$ and $t_c$ thus, considering $t_*$, $w_*$ and d as the transition t, w and d between phase I and II, the following relationship can be derived:

$$t - t_* = \varepsilon(d - d_*)$$

$$w - w_* = \zeta\varepsilon(d - d_*)$$

$$\frac{w - w_*}{t - t_*} = \zeta$$

$$w = \zeta t + (1 - \beta)w_{f_*}$$

Figures 8A, 8B, 8C, 8D:
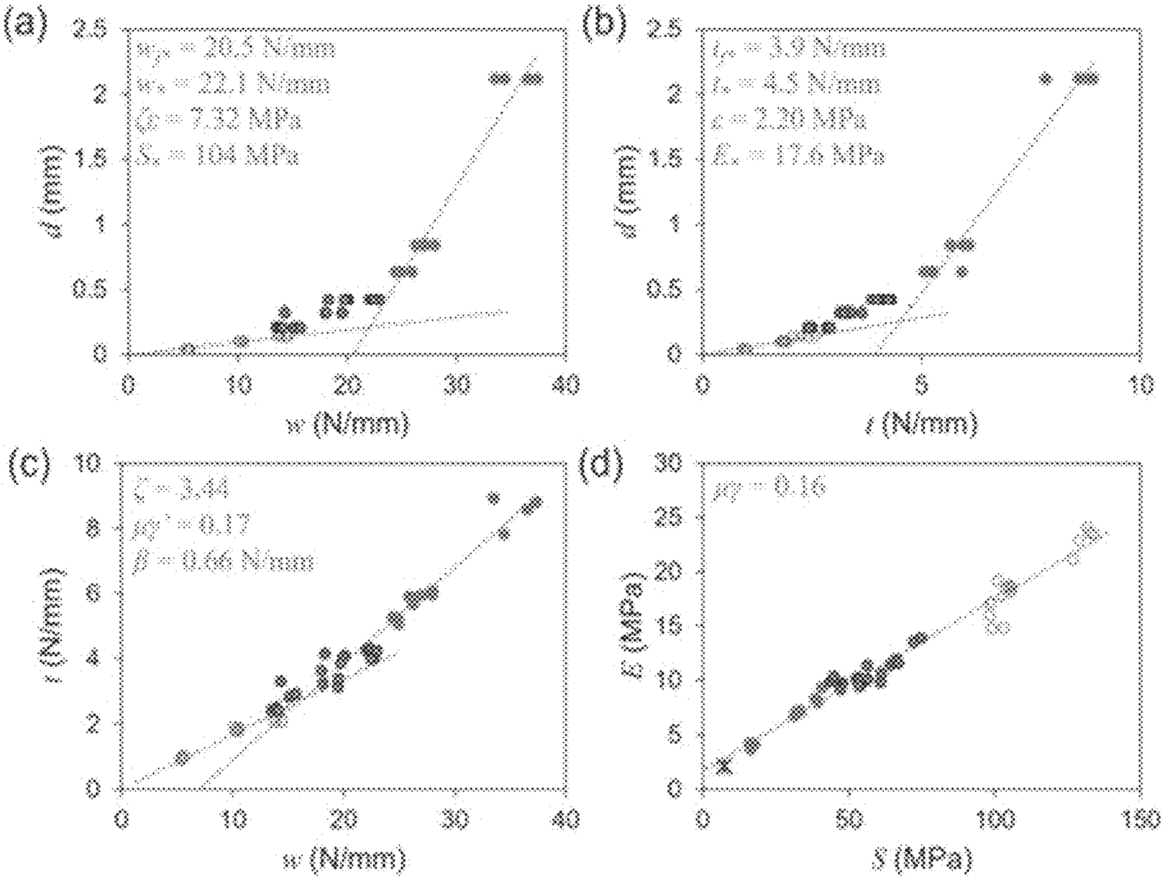
FIGS. 8(*a*)-8(*d*) are graphs showing the drilling response for the +30° drill bit component and fitted parameters: (a) d-w relationship: (b) (d-t relationship; (c) t-w relationship; (d) E-S relationship.
Figures 9A, 9B, 9C, 9D:
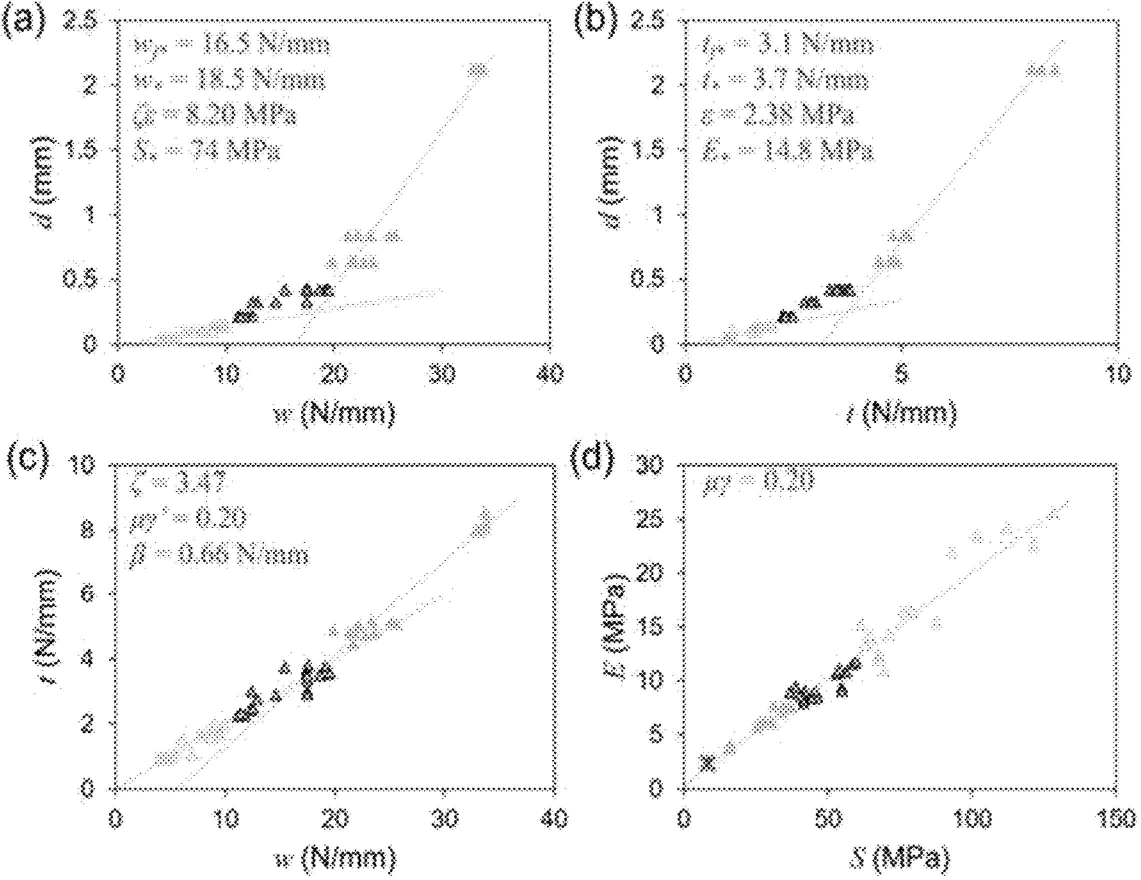
FIGS. 9(*a*)-9(*d*) are graphs showing the drilling response for the +30° drill bit component and fitted parameters: (a) d-w relationship: (b) (d-t relationship; (c) t-w relationship; (d) E-S relationship.
Figures 10A, 10B, 10C, 10D:
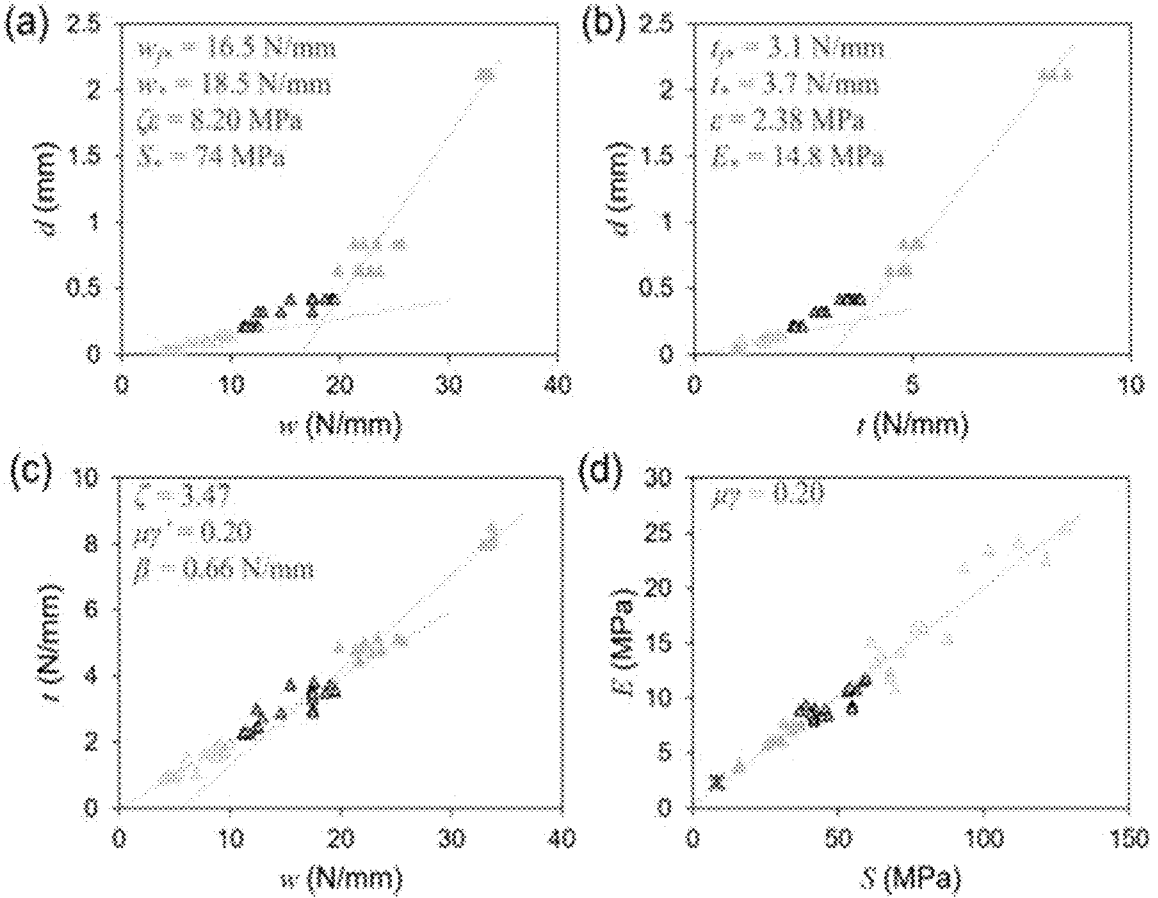
FIGS. 10(*a*)-10(*d*) are graphs showing the drilling response for the vertical drill bit component and fitted parameters: (a) d-w relationship; (b) d-t relationship; (c) t-w relationship; (d) E-S relationship.

The drilling response for the three drill bit components 200_a_, 200_b_, and 200_c_ using drilling apparatus 100 are summarized in FIGS. 8(_a_)-(_d_), FIGS. 9(_a_)-(_d_), and FIGS. 10(_a_)-(_d_). FIGS. 8(_a_)-(_d_) are graphs illustrating the drilling response for the +30° drill bit component 200_a_ and fitted parameters: (a) d-w relationship: (b) (d-t relationship; (c) t-w relationship; (d) E-S relationship. FIGS. 9(_a_)-(_d_) are graphs illustrating the drilling response for the −30° drill bit component 200_b_ and fitted parameters: (a) d-w relationship: (b) d-t relationship; (c) t-w relationship: (d) E-S relationship. FIGS. 10(_a_)-(_d_) are graphs illustrating the drilling response for the vertical drill hit component 200_c_ and fitted parameters: (a) d-w relationship; (b) d-t relationship; (c) t-w relationship; (d) E-S relationship.

Taking the +30° bit 200_a_ as an example, FIG. 8(_a_)-(_d_) plot the d-w, d-t, t-w and E-S relationship. Consistent with the Detournay model, d-w, d-t, and t-w responses show two phases, while the E-S relationship collapses to a single line. The transition between phases I and II is not abrupt, thus, data with d=0.042, 0.1, 0.14 nun/s are selected to fit the phase 1 relationship and marked in the figure using the hollow markers. Data with d=0.21, 0.32, and 0.42 mm/s are marked as the transition depth and with solid markers and black edges. Data with d=0.64, 0.84, 2.21 mm/s are chosen as the phase II cutting with solid markers. In FIG. 8(_a_), $S_*$ is fitted from the phase I d-w slope to be 100 MPa and $\zeta\varepsilon$=7.14 MPa from phase II slope. The transition weight-on-bit m*=24.2 N/mm, whose frictional component $w_{f*}$=22.5 N/mm, resulting in a cutting component $w_{c*}$=1.7 N/mm. In FIG. 8(_b_), $E_*$ and $\epsilon$ are calculated to be 17.4 MPa and 2.07 MPa, at transition point, $t_*$ and $t_{f*}$ are 3.9 and 3.5 N/mm. leaving $t_{c*}$=0.4 N/mm. From FIG. 8(_c_), $\zeta$ and $\mu\gamma'$=3.44 and 0.17, $\beta$ determined from the phase II slope intercepting the w axis is 0.53 N/mm. Finally, $\mu\gamma$ from FIG. 8(_d_) is 0.17, consistent with $\mu\gamma'$ which indicates that the phase I drilling is mainly friction. That is also validated by the fact that $w_{f*}$ and $t_{f*}$ are close to $w_*$ and $t_*$ respectively. The red "x" in FIG. 8(_d_) is located at point ($\zeta\epsilon$, $\epsilon$). This point means that the drilling is purely a cutting process, involving no friction. The breakage of rock is mainly caused by the cutting effort, while the frictional component is the wasted force that does not contribute to rock breakage. Thus, at the cutting point, a theoretical cutting efficiency of 100% is reached. All the cutting data has to lay to the right-top of this cutting point and whichever is closer to it has a higher cutting efficiency. The figure indicates that as the drilling depth per revolution d is increased, the cutting behavior shifted from phase I to transition to phase II with increased efficiency.

Values for the fitted parameters are summarized in Table 2 below. The vertical bit is more efficient in cutting since the transition from phase I to phase II is the closest to the cutting point on the E-S plot. That argument is also supported by the fact that the vertical bit at phase transition has the highest cutting percentage in both $$\frac{w_{c*}}{w_*} \text{ and } \frac{t_{c*}}{t_*}$$

as well as the largest intrinsic specific energy $\epsilon$. Meanwhile, since phase I is predominantly governed by friction, the earlier the transition to phase II the higher the efficiency. To that consideration, the vertical bit exhibits the smallest $w_*$ and $t_*$ further demonstrating its superiority.

When comparing the two bit components 200_a_ and 200_b_ of +30° and −30° rake angles, the negative angle bit exhibits smaller $w_*$ and larger $t_*$, slightly higher $$\frac{w_{c*}}{w_*} \text{ and } \frac{t_{c*}}{t_*}$$

and larger $\epsilon$. It also endures larger $\zeta$ meaning that the cutting force shared by w is higher than t compared with the positive angle counterpart. Recall that $w_f$ in phase I is proportional to the strength of the substrate $\sigma$ and kd, which can be recognized as the characteristic length of the frictional surface. At the transition point where $w_{f*}$ starts to remain constant, $w_{f*}$ is smaller for the −30° bit component 200_b_ than the +30° bit component 200_a_. That indicates that the characteristic frictional surface length is smaller for the negative rake angle bit, which is consistent with their geometry, further validating this conceptual model.

TABLE 2

| Drill bit | +30° | −30° | Vertical |
|---|---|---|---|
| w/d @ phase I $S_*$ [MPa] | 100 | 104 | 74 |
| t/d @ phase I $E_*$ [MPa] | 17.4 | 17.6 | 14.8 |
| Scaled WOB @ transition $w_*$ [N/mm] | 24.2 | 22.1 | 18.5 |
| Scaled torque @ transition $t_*$ [N/mm] | 3.9 | 4.5 | 3.7 |
| Frictional comp. of $w_*$, $w_{f*}$ [N/mm] | 22.5 | 20.5 | 16.5 |
| Cutting comp. of $w_*$, $w_{c*}$ [N/mm] | 1.7 | 1.6 | 2.0 |
| Frictional comp. of $t_*$, $t_{f*}$ [N/mm] | 3.5 | 3.9 | 3.1 |
| Cutting comp. of $t_*$, $t_{c*}$ [N/mm] | 0.4 | 0.6 | 0.6 |
| Intrinsic specific energy $\varepsilon$ [MPa] | 2.07 | 2.20 | 2.38 |
| Ratio of $w_*/t_*$, $\zeta$ | 3.44 | 7.32 | 3.47 |
| Ratio of $t_f/w_f$, $\mu\gamma$ (also t/w @ phase I, $\mu\gamma'$) | 0.17 | 0.17 | 0.20 |

While the vertical drill bit component 200_c_ outperforms the other two drill bit components 200_a_ and 200_b_ when considering cutting efficiency, in engineering practice, factors like the different levels of difficulty when manufacturing the cutter affect the popularity of a drill bit. +30° and −30° PDC cutters are relatively easy to produce with mature industrial practice. The diamond rounded disc has a flat surface. On the other hand, the diamond cutter may be adjusted to a curved surface for the vertical bit, increasing the manufacturing challenges and the cost. Damaging of the cutters should also be considered. Both the vertical and +30° cutters have sharp edges in contact with the substrate, elevation the risk of premature damage compared with the other one. Regardless, the apprehension regarding bit damage can be alleviated, with a heightened focus on enhancing cutting efficiency when drilling into soft formations.

Finally, in the Detournay model, a phase III is also proposed with a further increase of d after phase II. In this phase, the contact surface increases through the pile-up of cuttings caused by poor cleaning. Therefore, $w_f$ overpass $w_{f*}$ in the Detournay model, at this stage, there is no unique relationship between w-d and t-d. In this experiment, further increasing of d caused cutting clogging and non-repeatable w-d and t-d responses. Thus, the data gathered were abandoned. Clogging is never desired in industrial drilling practice; hence, the optimal cutting performance is in phase II.

Figure 11A:
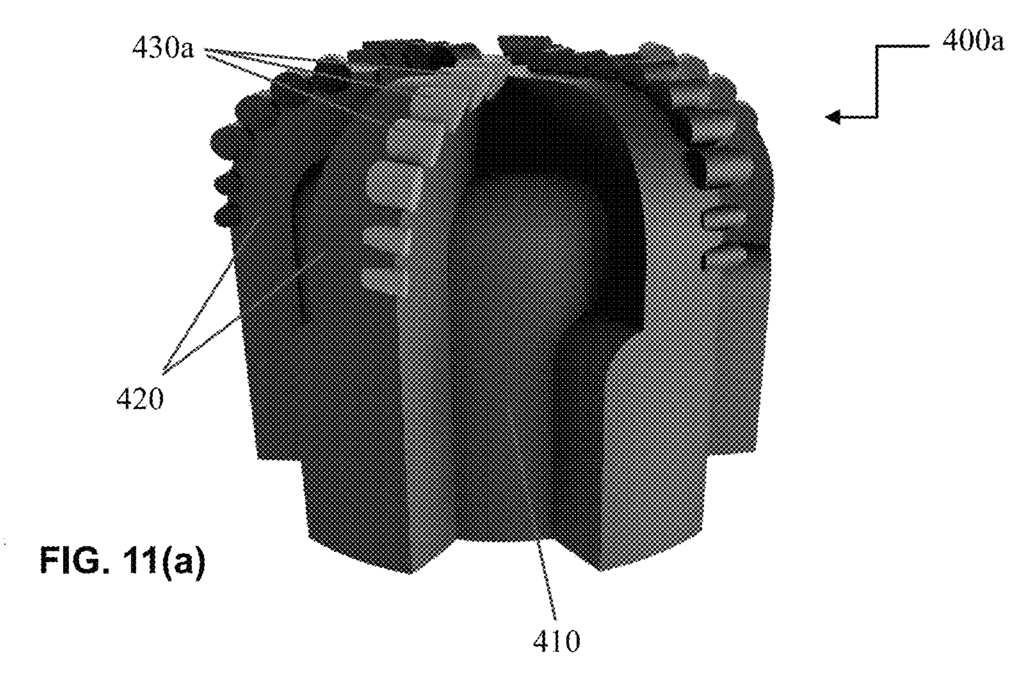
FIGS. 11(*a*)-11(*c*), 12(*a*)-12(*c*), and 13(*a*)-13(*c*) illustrate exemplary drill bits according to the present disclosure.
Figure 11B:
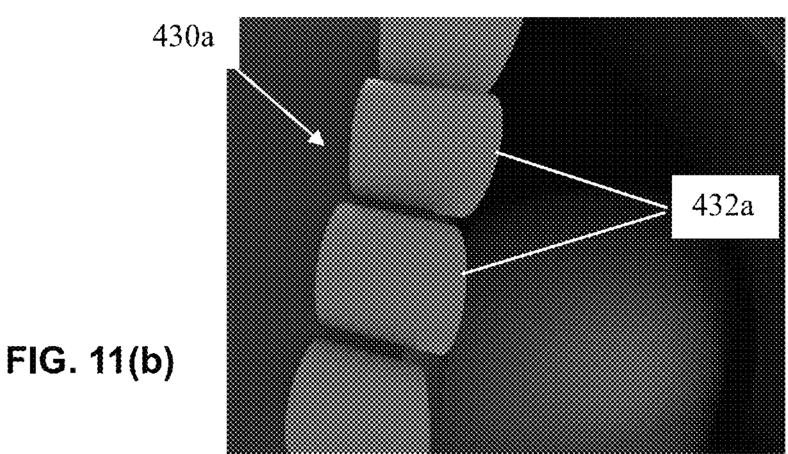
Figure 11C:
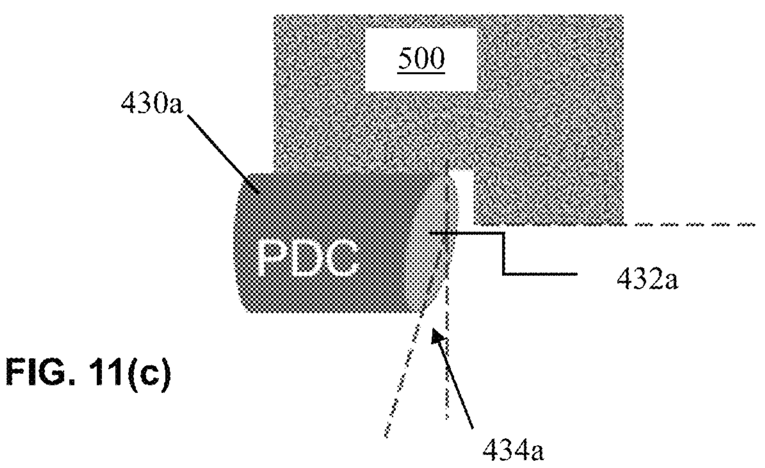

FIGS. 11(*a*)-11(*c*), 12(*a*)-12(*c*), and 13(*a*)-13(*c*) illustrate exemplary drill bits 400*a*, 400*b*, and 400*c* according to the present disclosure. Drill bits 400*a*, 400*b*, and 400*c* generally correspond to the drill bit components 200*a*, 200*b*, and 200*c* that were testing using drilling apparatus 100. Each drill bit 400*a*, 400*b*, and 400*c* generally includes a body 410 as the main structure of the drill bit, blades 420 that extend outwardly from body 410, the number of arrangement of which can vary depending on the chosen design and particular application, and a plurality of cutters 430*a*, 430*b*, and 430*c*, respectively, that are supported by blades 420 which interface with and cut the rock surface 500. The cutters can be evenly spaced from one another and each of the cutters can have a portion that is embedded in an edge of the one or more blades. Body 410 can be formed of steel or a steel composite. The cutters may by PDC cutters formed of a synthetic diamond material. The drill bits may also have nozzles (not shown) that allow drilling fluid to flow through the drill bit. The fluid can help cool the cutters, reduce friction, and remove cuttings from the well bore. The shank (not shown) of each drill bit can connect to a drill string and transmits a rotational force from the drilling rig to the drill bit.

FIG. 11(*a*) is a perspective view of drill bit 400*a* in which the cutters 430*a* thereof have a positive rake angle, e.g. +30° rake angle; FIG. 11(*b*) is an enlarged view of just the cutters 430*a* of drill bit 400*a*; and FIG. 11(*c*) is a view of one of the cutters 430*a* of drill bit 400*a* interfacing with a surface 500 to be drilled, such as a rock surface. Each of the cutters 430*a* has a cutter face 432*a* that interfaces with the surface 500. Each cutter face 432*a* can be generally elliptical and substantially flat. Cutters 430*a* can be arranged on drill bit 400*a* to have a positive rake angle 434*a*, e.g. +30° rake angle in reference to the direction that is perpendicular to the surface 500, as seen in FIG. 11(*c*).

Figures 12A, 12B, 12C:
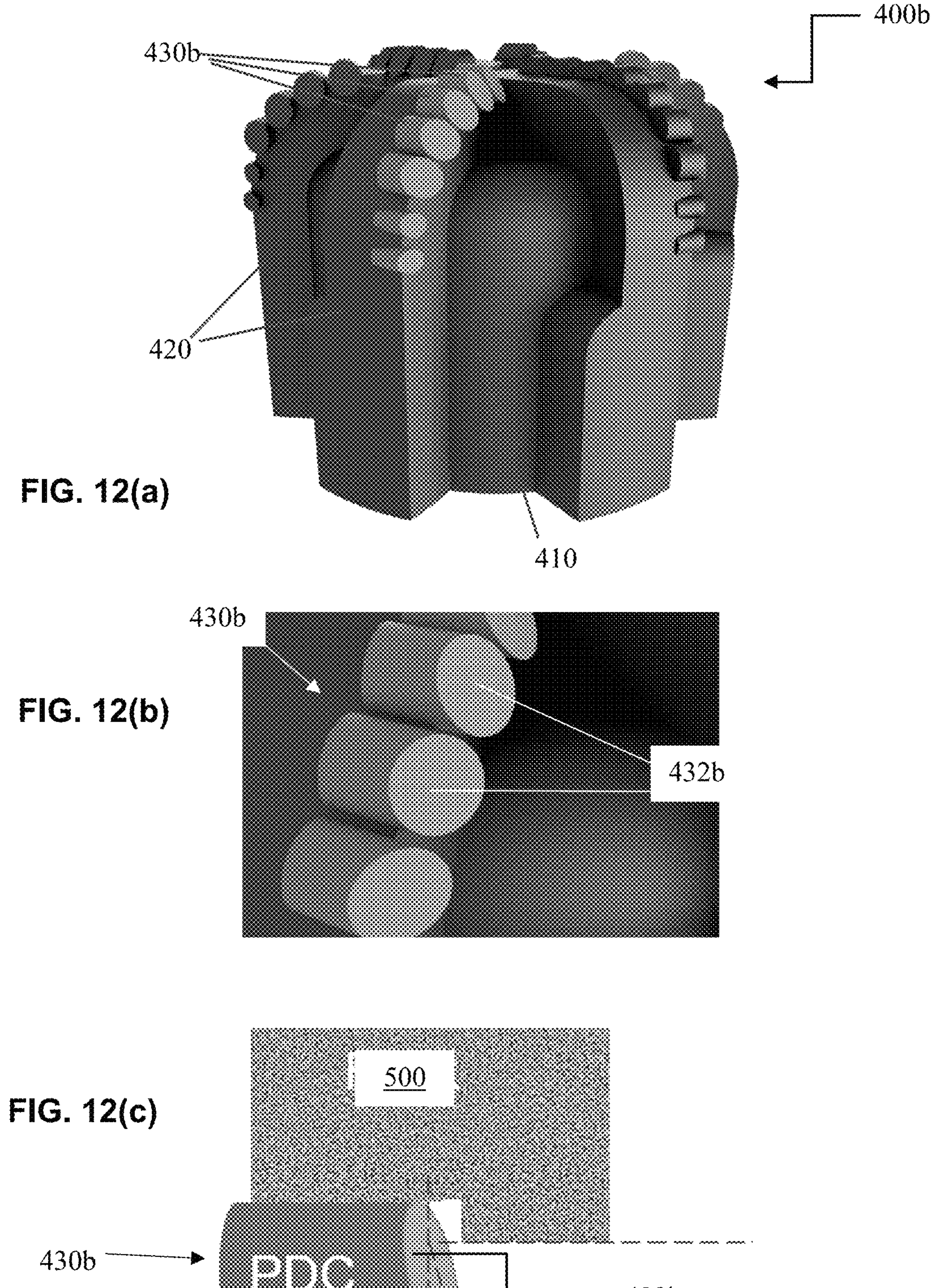

FIG. 12(*a*) is a perspective view of drill bit 400*b* in which the cutters 430*b* thereof that have a negative rake angle, e.g. −30° rake angle; FIG. 12(*b*) is an enlarged view of just the cutters 430*b* of drill bit 400*b*; and FIG. 12(*c*) is a view of one of the cutters 430*b* of drill bit 400*b* interfacing with surface 500 to be drilled. Each of the cutters 430*b* has a cutter face 432*b* that interfaces with the surface 500. Each cutter face 432*b* can be generally elliptical and substantially flat. Cutters 430*b* can be arranged on drill bit 400*b* to have a negative rake angle 434*b*, e.g. −30° rake angle in reference to the direction that is perpendicular to the surface 500, as seen in FIG. 12(*c*).

Figures 13A, 13B, 13C:
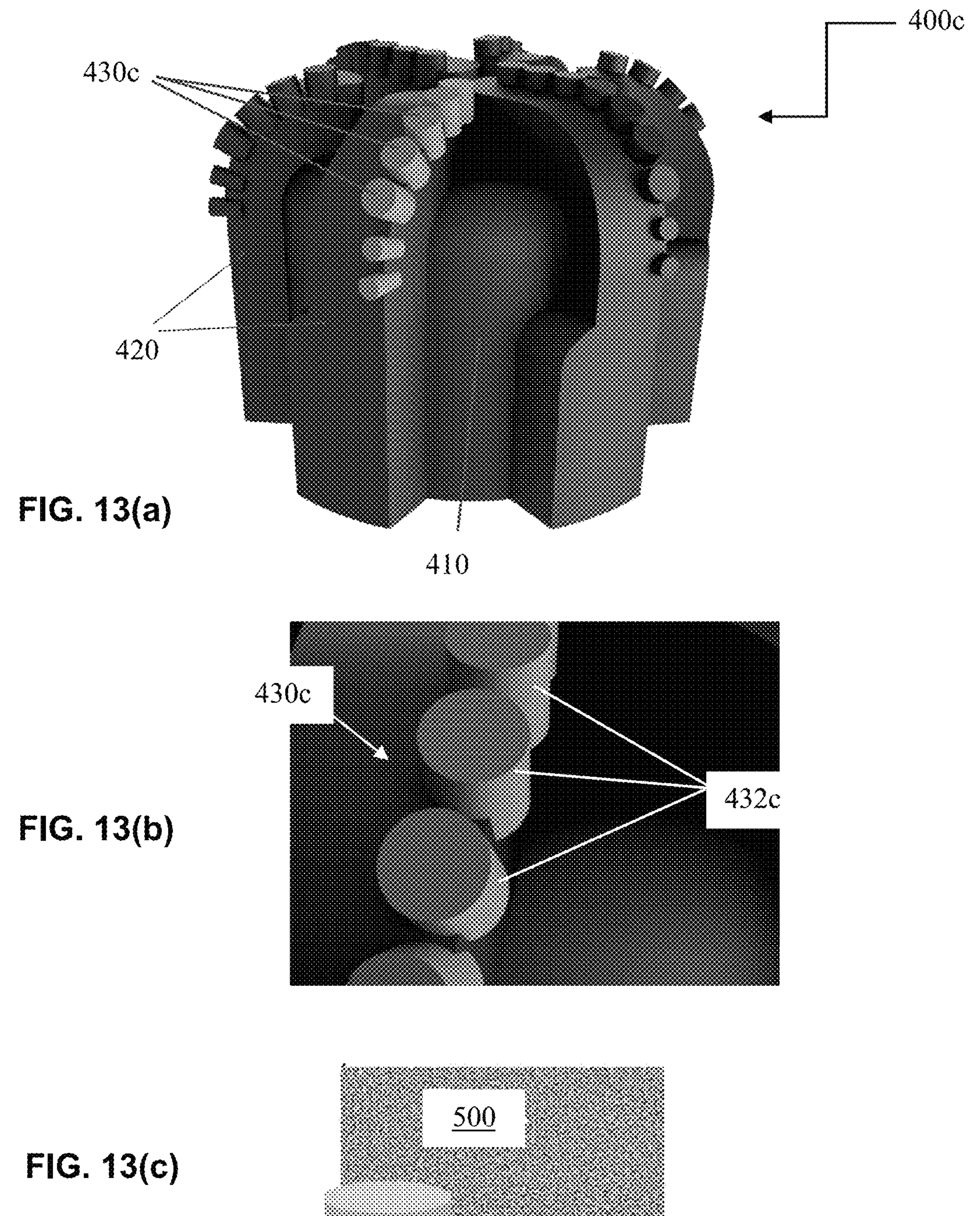

FIG. 13(*a*) is a perspective view of drill bit 400*c* in which the cutters 430*c* thereof are vertical, e.g. 0° rake angle, and curved; FIG. 13(*b*) is an enlarged view of just the cutters 430*c* of drill bit 400*c*; and FIG. 13(*c*) is a view of one of the cutters 430*c* of drill bit 400*c* interfacing with surface 500 to be drilled. Each of the cutters 430*c* has a cutter face 432*c* that interfaces with the surface 500. Each cutter face 432*b* can be substantially curved rather than flat like the faces 432*a* and 432*b* of drill bits 400*a* and 400*b*. Each cutter 430*c* can be vertically arranged on drill bit 400*c* such the cutter has a 0° rake angle in reference to the direction that is perpendicular to the surface 500, as seen in FIG. 13(*c*).

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as right, left, above, below, upper, lower, top, bottom, linear, arcuate, elongated, parallel, perpendicular, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A drilling apparatus for testing drill bit performance, comprising:
- a frame;
- a drill bit component supported by the frame;
- a vertical load mechanism supported by the frame above the drill bit component;
- a sample container for holding a substrate material, the sample container being coupled to the vertical load mechanism; and
- a rotary motion assembly operatively coupled to the drill bit component, the rotary motion assembly being configured to rotate the drill bit component,
- wherein the vertical load mechanism is configured to move the sample container downwardly at a constant displacement rate with respect to the frame and toward the drill bit component, while the rotary motion assembly rotates the drill bit component.

2. The drilling apparatus of claim 1, wherein the drill bit component has a plurality of cutters.

3. The drilling apparatus of claim 2, wherein the cutters of the drill bit component have a −30° rake angle, a +30° rake angle, or 0° rake angle.

4. The drilling apparatus of claim 2, wherein the plurality of cutters of the drill bit component have a shape that is substantially the same as cutters of a PDC drill bit.

5. The drilling apparatus of claim 1, wherein the drill bit component is formed of polylactic acid plastic material.

6. The drilling apparatus of claim 1, wherein the sample container holds the substrate material, and the substrate material is a paraffin wax.

7. The drilling apparatus of claim 1, wherein the rotary motion assembly comprises a stepper motor and a gear box, and the stepper motor is operatively connected to the drill bit component in order to rotate the drill bit component.

8. The drilling apparatus of claim 1, further comprising a torque sensor connected to the drill bit component and connected to the rotary motion assembly for measuring the torque being applied to the drill bit component by the rotary motion assembly.

9. The drilling apparatus of claim 8, wherein the torque sensor is connected to the drill bit component by a rigid coupling and is connected to the rotary motion assembly by a flexible coupling.

10. The drilling apparatus of claim 1, wherein the vertical load mechanism comprises a load support and a load cell attached to the load support, wherein the load cell is coupled to a top of the sample container.

11. The drilling apparatus of claim 10, wherein the load support is configured to be vertically moveable with the respect to the frame to move the sample container downward toward the drill bit component.

12. A method of using the drilling apparatus according to claim 1, wherein the substrate material is held in the sample container, the method comprising moving, via the vertical load mechanism, the sample container vertically downward at the constant displacement rate until the drill bit component penetrates the substrate material while the drill bit component is being rotated by the rotary motion assembly.

13. A method of testing drill bit performance, comprising:
- moving a substrate material vertically downward toward a drill bit component at a constant displacement rate;
- rotating the drill bit component while moving the substrate material vertically downward toward the drill bit component until the drill bit component penetrates the substrate material;
- then recording data from the drill bit component penetrating the substrate material including weight-on-bit, cutting depth per revolution, and reactive torque; and
- analyzing a cutting performance of the drill bit component based on the recorded data using a Detournay model to decipher cutting and frictional contact response of the drill bit component.

14. The method of claim 13, wherein the substrate material comprises paraffin wax and the drill bit component comprises a polylactic acid plastic material.

15. The method of claim 13, further comprising 3D printing the drill bit component to have a shape and cutters that mimic a shape and cutters of a PDC drill bit.

16. The method of claim 13, wherein a vertical load mechanism applies force to a sample container holding the substrate material to move the sample container and substrate material toward the drill bit component until the drill bit component penetrates the substrate material, and wherein a rotary motion assembly operatively coupled to the drill bit component rotates the drill bit component, and a torque sensor measures a torque of the drill bit component applied by the rotary motion assembly.

* * * * *